United States Patent
Inagaki et al.

(10) Patent No.: US 9,431,657 B2
(45) Date of Patent: Aug. 30, 2016

(54) ACTIVE MATERIAL, NONAQUEOUS ELECTROLYTE BATTERY, AND BATTERY PACK

(71) Applicant: Kabushiki Kaisha Toshiba, Minato-ku (JP)

(72) Inventors: Hiroki Inagaki, Yokohama (JP); Kazuki Ise, Fuchu (JP); Yasuhiro Harada, Yokohama (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 253 days.

(21) Appl. No.: 13/960,005

(22) Filed: Aug. 6, 2013

(65) Prior Publication Data

US 2014/0044997 A1 Feb. 13, 2014

(30) Foreign Application Priority Data

Aug. 7, 2012 (JP) ................. 2012-174813

(51) Int. Cl.
| | | |
|---|---|---|
| *H01M 4/485* | (2010.01) | |
| *H01M 4/505* | (2010.01) | |
| *H01M 4/525* | (2010.01) | |
| *C01G 33/00* | (2006.01) | |

(Continued)

(52) U.S. Cl.
CPC .......... *H01M 4/485* (2013.01); *C01G 33/006* (2013.01); *H01M 4/505* (2013.01); *H01M 4/525* (2013.01); *C01P 2002/77* (2013.01); *C01P 2006/12* (2013.01); *C01P 2006/40* (2013.01); *H01M 10/0525* (2013.01); *H01M 10/425* (2013.01); *H01M 10/482* (2013.01); *Y02E 60/122* (2013.01); *Y10T 428/2982* (2015.01)

(58) Field of Classification Search
CPC ........... C01G 33/006; C01G 2002/77; C01G 2006/12; C01G 2006/40; H01M 10/0525; H01M 10/425; H01M 10/482; H01M 4/485; H01M 4/505; H01M 4/525
USPC .......................................................... 429/7
See application file for complete search history.

(56) References Cited

U.S. PATENT DOCUMENTS

| | | | |
|---|---|---|---|
| 9,240,590 B2 * | 1/2016 | Harada | ................. H01M 4/485 |
| 2008/0078594 A1 * | 4/2008 | Harada et al. | ............... 180/65.2 |

(Continued)

FOREIGN PATENT DOCUMENTS

| | | |
|---|---|---|
| CN | 100573983 C | 12/2009 |
| CN | 102024949 A | 4/2011 |

(Continued)

OTHER PUBLICATIONS

Cava, Lithium Insertion in Wadsley-Roth Phases Based on Niobium Oxide J. Electrochem. Soc. (1983), 130, (12), 2345-51.*

(Continued)

*Primary Examiner* — Jonathan Jelsma
*Assistant Examiner* — Rashid Alam
(74) *Attorney, Agent, or Firm* — Oblon, McClelland, Maier & Neustadt, L.L.P.

(57) ABSTRACT

According to one embodiment, an active material containing a monoclinic oxide is provided. The monoclinic oxide is represented by the formula $Li_xTiNb_2O_7$ ($0 \leq x \leq 5$). A unit cell volume of the monoclinic oxide is 795 Å$^3$ or more.

12 Claims, 5 Drawing Sheets

(51) Int. Cl.
   *H01M 10/0525* (2010.01)
   *H01M 10/42* (2006.01)
   *H01M 10/48* (2006.01)

(56) References Cited

U.S. PATENT DOCUMENTS

| 2011/0059366 | A1 | 3/2011 | Eom |
| 2012/0107692 | A1 | 5/2012 | Harada et al. |
| 2013/0115516 | A1* | 5/2013 | Naoi et al. ................ 429/231.1 |

FOREIGN PATENT DOCUMENTS

| CN | 102544466 A | 7/2012 |
| JP | 2004-47180 A | 2/2004 |
| JP | 2008-91079 A | 4/2008 |
| JP | 2010-287496 | 12/2010 |
| JP | 2012-99287 A | 5/2012 |
| JP | 2014-35808 A | 2/2014 |
| WO | WO 2011138866 A1 * | 11/2011 |

OTHER PUBLICATIONS

Office Action issued Aug. 19, 2014, in Japanese Patent Application No. 2012-174813 with English translation.
Combined Office Action and Search Report issued Apr. 3, 2015 in Chinese Patent Application No. 201310341605.2 (with English language translation).
C.M. Reich et al. "Niobia Based Rutile Materials as SOFC Anodes", Fuel cells 2001, 1, No. 3-4, pp. 249-255.
Madeleine Gasperin et al. "Affinement de la Structure de $TiNb_2O_7$ et repartition des cations", Journal of Solid State Chemistry 53, 1984, pp. 144-147.
Office Action issued Oct. 28, 2015 in Chinese Patent Application No. 201310341605.2 (with English translation).
Office Action issued Nov. 4, 2015 in Japanese Patent Application No. 2015-016649 (with English language translation).

* cited by examiner

ACTIVE MATERIAL, NONAQUEOUS ELECTROLYTE BATTERY, AND BATTERY PACK

CROSS-REFERENCE TO RELATED APPLICATIONS

This application is based upon and claims the benefit of priority from prior Japanese Patent Application No. 2012-174813, filed Aug. 7, 2012, the entire contents of which are incorporated herein by reference.

FIELD

Embodiments described herein relate generally to active material, nonaqueous electrolyte battery and battery pack.

BACKGROUND

In recent years, nonaqueous electrolyte batteries such as lithium ion secondary batteries have been developed as a high energy density battery. These nonaqueous electrolyte batteries are expected as the electric sources of hybrid electric vehicles and electric vehicles. Also, these nonaqueous electrolyte batteries are expected as an uninterruptible power supply in a mobile base station. For this, these nonaqueous electrolyte batteries are desired to have other performance such as quick charge/discharge performance and long-term reliability. A nonaqueous electrolyte battery enabling quick charge/discharge has such a merit that charge time is very short and also, the engine performance of a hybrid vehicle can be improved and also, regenerative energy of the engine can be recovered efficiently.

The quick charge/discharge is made possible when electrons and lithium ions are quickly transferred between the positive electrode and the negative electrode. In a battery using a carbon type negative electrode, a dendrite of metal lithium sometimes precipitates on the electrode when quick charge/discharge is repeated. Dendrite causes internal short circuits with the result that there is a fear of heat generation and ignition.

In light of this, a battery has been developed which uses a metal complex oxide in place of a carbonaceous material. A battery using lithium-titanium oxide as a negative electrode active material enables stable quick charge/discharge and therefore has the performance that it has a longer life as compared with a battery using a carbon negative electrode.

However, the lithium-titanium oxide has a higher potential based on metal lithium (nobler) than the carbonaceous material. In addition, lithium-titanium oxide has a low capacity per weight. The battery using lithium-titanium oxide has a problem concerning a low energy density.

For example, the electrode potential of lithium-titanium oxide is about 1.5 V (vs. Li/Li$^+$) which is higher (nobler) than the potential of a carbon type negative electrode. Because the potential of lithium-titanium oxide is caused by a redox reaction between Ti$^{3+}$ and Ti$^{4+}$ when lithium is electrochemically inserted or released, it is electrochemically limited. Also, because the electrode potential is as high as about 1.5 V, this allows stable operation of quick charge/discharge of lithium ions. It is therefore substantially difficult to drop the electrode potential with the intention of improving energy density.

With regard to the capacity per unit weight, on the other hand, the theoretical capacity of lithium-titanium oxide such as Li$_4$Ti$_5$O$_{12}$ is about 175 mAh/g. On the other hand, the theoretical capacity of a general graphite type electrode material is 372 mAh/g. Accordingly, the volumetric density of lithium-titanium oxide is significantly lower than that of a carbon type negative electrode. This reason is that the number of sites absorbing lithium is small in the crystal structure of lithium titanium oxide and substantial capacity is dropped because lithium is easily stabilized in the structure.

In light of the above description, studies as to new electrode materials including Ti and Nb are being made. These materials are expected to have a high charge/discharge capacity. Particularly, a complex oxide represented by TiNb$_2$O$_7$ has a high theoretical capacity exceeding 300 mAh/g. However, it is necessary to calcine at a temperature as high as 1300 to 1400° C. to improve the crystallinity of a complex oxide such as TiNb$_2$O$_7$, giving rise to problems concerning low productivity and deterioration in quick charge/discharge performance.

DETAILED DESCRIPTION

According to one embodiment, an active material containing a monoclinic oxide is provided. The monoclinic oxide is represented by the formula Li$_x$TiNb$_2$O$_7$ (0≤x≤5). A unit cell volume of the monoclinic oxide is 795 Å$^3$ or more.

According to the embodiment, a nonaqueous electrolyte battery including a positive electrode, a negative electrode, and a nonaqueous electrolyte is provided. The negative electrode contains the active material according to the embodiment.

Moreover, according to the embodiment, a battery pack including the nonaqueous electrolyte battery according to the embodiment is provided.

Embodiments will be explained with reference to the drawings.

First Embodiment

An active material according to a first embodiment contains monoclinic oxide represented by the formula Li$_x$TiNb$_2$O$_7$ (0≤x≤5). The unit cell volume of the monoclinic oxide is 795 Å$^3$ or more.

Figure 1:
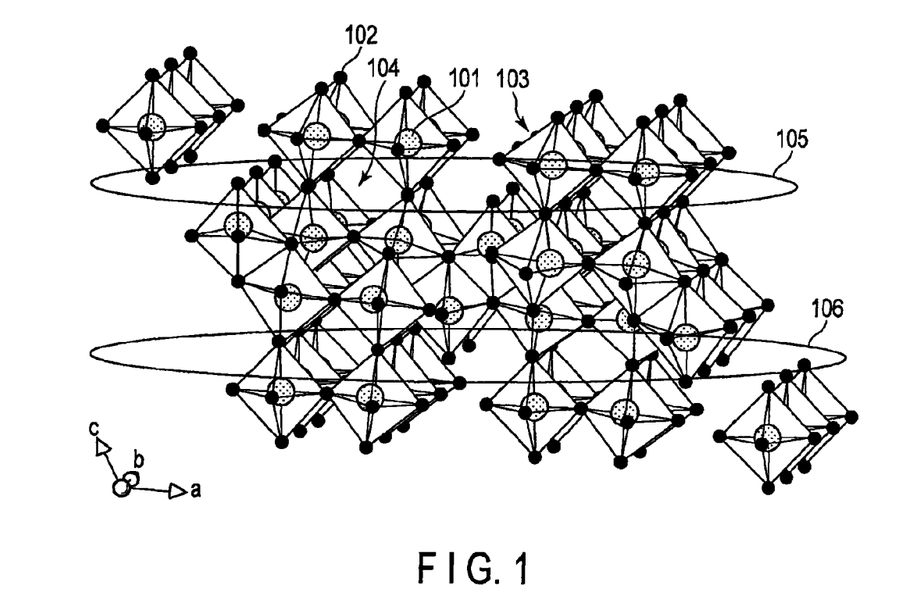
FIG. 1 is a typical view showing the crystal structure of a monoclinic type TiNb$_2$O$_7$.

As shown in FIG. 1, the crystal structure of the monoclinic type TiNb$_2$O$_7$ includes a metal ion 101 and an oxide ion 102 which constitute a skeleton structure part 103. As the metal ion 101, a Nb ion and a Ti ion are arranged at random in a ratio (Nb:Ti) of 2:1. The skeleton structure parts 103 are alternately arranged three-dimensionally, allowing the presence of voids 104 therebetween. This void 104 constitutes a host of lithium ions.

Figure 2:
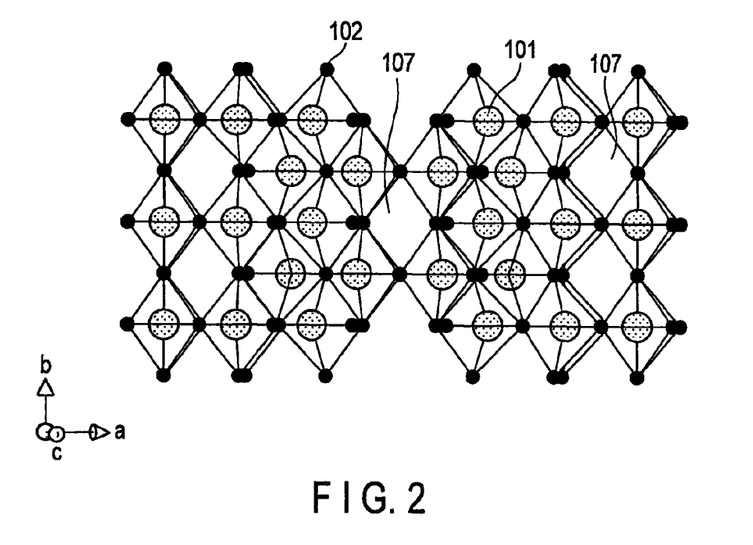
FIG. 2 is a typical view of the crystal structure of FIG. 1 as viewed from another direction.

In FIG. 1, a region 105 and a region 106 are parts having two-dimensional channels in the [100] direction and [010] direction respectively. As shown in FIG. 2, a void 107 exists in the [001] direction in the crystal structure of monoclinic type $TiNb_2O_7$. This void 107 has a tunnel structure advantageous in the conduction of lithium ions and constitutes a conductive path extending in the [001] direction and connecting the region 105 with the region 106. The presence of this conductive path enables lithium ions to move between the regions 105 and 106.

As mentioned above, the monoclinic crystal structure has a large space where lithium ions are inserted from all directions without the dependence on the direction. Also, the monoclinic crystal structure is structurally stable, and allows the presence of the regions having the two-dimensional channel where lithium ions are rapidly diffused and the conductive path extending the [001] direction and connecting these regions. Therefore, the ability to insert lithium ions into and to release lithium ions from the insertion space is improved and also, the lithium ion insertion and release space is increased effectively. This contributes to the achievement of high capacity and high-rate performance.

It is important to accelerate the diffusion of lithium ions in the [001] direction to achieve high capacity and high-rate performance. When the unit cell volume of the monoclinic oxide represented by $Li_xTiNb_2O_7$ is 795 Å or more, the diffusion of lithium ions in the [001] direction can be accelerated and therefore, the capacity and rate performance can be improved. This monoclinic oxide has a lithium absorption/release potential of about 1.5 V (vs. Li/Li$^+$). Accordingly, even if lithium absorption/release is performed at a high rate, the lithium absorption/release potential does not reach the potential (about 0 V vs. Li/Li$^+$) at which lithium precipitates and therefore, quick charge/discharge can be performed stably and repeatedly. This enables the achievement of excellent quick charge/discharge performance. In this case, the unit cell volume is preferably designed to be in a range from 795 Å to 800 Å$^3$ to accelerate the diffusion of lithium ions in the [001] direction, while maintaining a desired crystal structure.

Also, in the above crystal structure, the metal ion 101 constituting the skeleton is reduced to the trivalent state when a lithium ion is inserted into the void 104, ensuring that the electrical neutrality of the crystal is kept. In the monoclinic oxide represented by $Li_xTiNb_2O_7$, not only a Ti ion is reduced to the trivalent state from the tetravalent state but also a Nb ion is reduced to the trivalent state from the pentavalent state. For this, the number of reduced valences per weight of the active material is large. Therefore, the electrical neutrality of the crystal can be maintained even if a large number of lithium ions are inserted. For this, this monoclinic oxide has a higher energy density than a compound such as titanium oxide only containing a tetravalent cation. The theoretical capacity of the monoclinic oxide represented by $Li_xTiNb_2O_7$ is about 387 mAh/g and this value is two times larger that of lithium-titanium oxide having a spinel structure.

The above facts show that a battery active material having excellent quick charge/discharge performance and a high energy density can be provided by using an active material represented by $Li_xTiNb_2O_7$ (0≤x≤5) and a unit cell volume of 795 Å$^3$ or more.

Also, because the diffusion of lithium ions in the direction can be more accelerated by designing the following lattice constant a of the monoclinic oxide: 20.37 Å≤a≤20.53 Å, the quick charge/discharge performance and energy density can be more improved.

Because the conductivity of the active material can be improved when the monoclinic oxide has oxygen defects, the quick charge/discharge performance can be more improved. The amount of oxygen in $Li_xTiNb_2O_7$ can be measured by an inert gas fusion infrared absorption method and oxygen deficiency can be estimated from the amount of oxygen to be measured.

The monoclinic oxide contained in the active material of this embodiment and represented by $Li_xTiNb_2O_7$ preferably has a crystal structure having space group C2/m symmetry and the atomic coordinate described in Non-patent Document 2 (Journal of Solid State Chemistry 53, pp 144-147 (1984)) though the embodiment is not limited to this.

No particular limitation is imposed on the average particle diameter of the monoclinic oxide, and the average particle diameter can be changed corresponding to desired battery performance. The BET specific surface area of the monoclinic oxide is preferably 0.1 m$^2$/g or more and less than 100 m$^2$/g though no particular limitation is imposed on it.

When the specific surface area is 0.1 m$^2$/g or more, the contact area between the active material and the nonaqueous electrolyte can be sufficiently secured and a good discharge rate performance is easily obtained. Also, the charge time can be shortened. When the specific surface area is less than 100 m$^2$/g on the other hand, the reactivity between the active material and the nonaqueous electrolyte is not so large and therefore, the life performance can be improved. Also, in the electrode production process, the coatability of a slurry containing the active material can be improved.

Here, the specific surface area is measured using a method in which a molecule of which the molecule area at the monolayer is known is made to adsorb to the surface of the powder particle, to find the specific surface area from the quantity of the sample to be adsorbed. The most utilized method is a BET method in which inert gas is physically adsorbed in a low-temperature and low-humidity environment. This BET method is a method obtained by extending the Langmuir theory which is a monomolecular layer adsorption theory to multilayer adsorption. Also, this BET method is most famous as the calculation method of specific surface area. The specific surface area found by this method is called BET specific surface area.

<Production Method>

The active material of the embodiment may be produced by a method involving a step of grinding a starting material mixture, a step of calcining the mixture at a temperature range from 500 to 1400° C., and a step of quickly cooling the calcined mixture by using water or liquid nitrogen. This method will be explained.

First, starting materials are blended to obtain a mixture. As the starting materials for the monoclinic oxide represented by the formula $TiNb_2O_7$, an oxide or salt containing Ti and Nb is used. The salt used as the starting material is preferably a salt such as a carbonate or nitrate which is decomposed at a relatively low temperature to generate an oxide.

Next, the obtained mixture is ground to obtain a mixture mixed as uniformly as possible. The mixture is preferably molded into a pellet form. This allows the mixture to be calcined in such a manner that the starting materials are sufficiently brought into contact with each other. Therefore, even in the case where a flux (for example, a lithium-containing compound such as lithium carbonate) is not contained, the generation of an impurity phase is reduced and a single phase monoclinic oxide is easily synthesized.

Then, the obtained mixture is calcined. The calcination is performed at a temperature range from 500 to 1400° C. for a total of 10 to 40 hours. The calcination is preferably performed at a temperature range from 800 to 1200° C.

Then, the calcined mixture is quickly cooled to a fixed temperature when cooled after the calcination. The monoclinic oxide represented by the formula $TiNb_2O_7$ shows a positive linear expansion coefficient. The rise in temperature is associated with increase in the unit cell volume and when the monoclinic oxide is cooled quickly under a proper condition from a high-temperature environment, the expansion of the unit cell volume at a high temperature is maintained until the temperature dropped to room temperature. Such a material can be more improved in quick charge/discharge performance than an active material obtained through a slow cooling process such as furnace cooling. Also, when quick cooling is performed, oxygen defects are easily introduced into the monoclinic oxide represented by the formula $TiNb_2O_7$. The conductivity of the active material is improved by the introduction of oxygen defects and therefore, quick charge/discharge performance can be improved.

The rate of quick cooling is 100° C./hr or more, preferably 300° C./hr or more, and more preferably 700° C./hr or more. When the rate of quick cooling is slower than 100° C./hr, there is a tendency that an intended unit cell volume is not obtained. The upper limit of the rate of quick cooling is, though not particularly limited, usually 100000° C./hr from the viewpoint of operability. Examples of the quick cooling method include, though not particularly limited to, quick cooling using water or liquid nitrogen and quick cooling in a dry gas stream.

In this case, the monoclinic oxide synthesized by the above method and represented by the formula $TiNb_2O_7$ is converted into a monoclinic oxide represented by the formula $Li_xTiNb_2O_7$ (0≤x≤5) when lithium ions inserted by charging are present as a reversible capacitance. Also, the monoclinic oxide may be synthesized as a lithium-containing complex oxide represented by the formula $Li_xTiNb_2O_7$ (0≤x≤5) by using, as the starting materials, an oxide or salt containing Ti and Nb and a lithium-containing compound such as lithium carbonate.

According to the method of the embodiment, the same effect can be obtained also in the case of including elements other than Ti and Nb.

<Wide Angle X-Ray Diffraction Measurement>

The crystal structure of the monoclinic oxide represented by the formula $Li_xTiNb_2O_7$ may be detected by wide-angle X-ray diffraction (WAXD).

The wide-angle X-ray diffraction measurement of the active material is made as follows. First, a subject sample is ground until the average particle diameter is decreased to about 5 μm. The average particle diameter may be found by a laser diffraction method. The ground sample is filled in a 0.2-mm-deep holder part formed on a glass sample plate. At this time, much care is necessary to fill the holder part fully with the sample. Also, special care should be taken to avoid cracking and formation of voids caused by insufficient filling of the sample. Then, a separate glass plate is used to smooth the surface of the sample by sufficiently pressing the separate glass plate against the sample. Much care should be taken to avoid a lack (cracks and voids) in the amount of the sample to be filled, thereby preventing any rise and dent from the basic plane of the holder part. Then, the glass sample plate filled with the sample is mounted on the wide-angle X-ray diffractometer to obtain a diffraction pattern by using Cu-Kα rays.

When the orientation of the sample is high, there is the possibility that the position of the peak is shifted and the intensity ratio is varied depending on the way of filling of the sample. Such a sample is measured after it is made into a pellet form. The pellet may be a green compact having, for example, a diameter of 10 mm and a thickness of 2 mm. The green compact may be manufactured by applying a pressure of about 250 MPa to the sample for 15 minutes. The obtained pellet is mounted on a wide-angle X-ray diffractometer to measure the surface of the pellet. The measurement using such a method can exclude the difference in measuring result between operators to thereby improve reproducibility.

When the active material contained in the electrode is measured by wide-angle X-ray diffraction, this can be attained by, for example, the following method.

The active material is put into the condition that lithium ions are completely released from the monoclinic oxide represented by the formula $Li_xTiNb_2O_7$. When the active material is used as, for example, the negative electrode, the battery is put into a completely discharged state. However, there is the case where lithium ions left unremoved exist in such a discharged state. Next, the battery is dismantled in a glove box filled with argon and washed with a proper solvent. As the solvent, it is preferable to use, for example, ethyl methyl carbonate. An electrode part having almost the same area as the holder part of the wide-angle X-ray diffractometer may be cut from the washed electrode and applied directly to the holder part to measure. At this time, WAXD is measured in advance corresponding to the type of metal foil of the electrode current collector to confirm at what position the peak derived from the current collector appears. Also, the presence or absence of peaks derived from ingredients such as a conductive agent and binder are confirmed in advance. When the peak of the current collector is overlapped on the peak of the active material, it is desirable to measure after the active material is peeled from the current collector. This reason is that the overlapped peaks are separated from each other to measure the intensity of each peaks. Of course, this operation may be omitted if these peaks are confirmed in advance. Although the electrode may be peeled off physically, it is easily peeled off when ultrasonic wave is applied to it in a solvent. The measurement of the electrode part recovered in this manner enables wide-angle X-ray diffraction measurement of the active material.

The results of wide-angle X-ray diffraction obtained in this manner are analyzed by a Rietveld method. In this Rietveld method, all diffraction patterns measured from a crystal structure may be checked whether they are fitted to diffraction patterns calculated from a crystal structure estimated in advance to refine the parameters (for example, lattice constant, atomic coordinate, and occupancy) relating to crystal structure and also, the characteristic of the crystal structure of the synthesized material can be examined.

<Content of Oxygen>

The content of oxygen may be measured by an inert gas fusion infrared absorption method. The measurement made to detect the content of oxygen by the inert gas fusion infrared absorption method can be accomplished according to, for example, the following method. A battery put into a fully discharged state is dismantled to take out the electrode (for example, the negative electrode) and then, the negative electrode active material-containing layer is deactivated in water. Thereafter, the active material containing the monoclinic oxide contained in the negative electrode active material-containing layer and represented by the formula $Li_xTiNb_2O_7$ is extracted. The extracting treatment may be carried out, for example, by performing heat treatment in an atmosphere to remove the conductive agent and binder from the negative electrode active material-containing layer. After the amount of the extracted active material is measured to put the extracted active material in a container, the content of oxygen is measured by a measuring instrument (trade name: TC-600 model, manufactured by LECO Corporation).

According to the active material of the first embodiment, it contains the monoclinic oxide represented by the formula $Li_xTiNb_2O_7$ ($0 \leq x \leq 5$) and having a unit cell volume of 795 Å$^3$ or more, a battery active material which is superior in productivity and has an excellent quick charge/discharge performance and a high energy density can be provided.

Second Embodiment

According to a second embodiment, there is provided a nonaqueous electrolyte battery including a negative electrode containing the active material according to the first embodiment, a positive electrode, and a nonaqueous electrolyte. The nonaqueous electrolyte battery of the second embodiment may include a separator interposed between the negative electrode and positive electrode and a case in which the negative electrode, positive electrode, separator, and nonaqueous electrolyte are accommodated.

The negative electrode, positive electrode, nonaqueous electrolyte, separator, and case will be explained in detail.

1) Negative Electrode

The negative electrode includes a current collector and a negative electrode active material-containing layer (negative electrode material layer). The negative electrode active material-containing layer is formed on one or both surfaces of the current collector and contains an active material, and optionally, a conductive agent, and a binder.

As the negative electrode active material, the active material explained in the first embodiment is used. Although the active material explained in the first embodiment may be used singly as the negative electrode active material, it may be used in combination with other active materials. Examples of these other active materials include titanium dioxide ($TiO_2$) having an anatase structure or monoclinic β-type structure, lithium titanate (for example, $Li_2Ti_3O_7$) having a ramsdellite structure, and lithium titanate ($Li_4Ti_5O_{12}$) having a spinel structure.

The conductive agent is formulated to improve current-collecting performance and to restrain the contact resistance between the active material and the current collector. Examples of the conductive agent include carbonaceous materials such as acetylene black, carbon black, or graphite.

The binder is formulated to fill clearances between dispersed negative electrode active materials and also to bind the active material with the current collector. Examples of the binder include a polytetrafluoroethylene (PTFE), polyvinylidene fluoride (PVdF), fluoro-rubber, and styrene-butadiene rubber.

The active material, conductive agent, and binder in the negative electrode active material-containing layer are preferably blended in ratios of 68% by mass to 96% by mass, 2% by mass to 30% by mass, and 2% by mass to 30% by mass respectively. When the amount of the conductive agent is 2% by mass or more, the current collecting performance of the negative electrode active material-containing layer can be improved. Also, when the amount of the binder is 2% by mass or more, the binding strength between the negative electrode active material-containing layer and the current collector can be improved, and therefore excellent cycle performance can be expected. On the other hand, the amounts of the conductive agent and binder are respectively preferably 28% by mass or less with the view of developing a high-capacity battery.

As the current collector, a material is used which is electrochemically stable in a potential range where the negative electrode active material absorbs or releases lithium. The current collector is preferably made of copper, nickel, stainless, or aluminum, or an aluminum alloy containing one or more elements selected from the group consisting of Mg, Ti, Zn, Mn, Fe, Cu, and Si. The thickness of the current collector is preferably 5 to 20 µm. The current collector having such a thickness keeps balance between the strength and light-weight performance of the negative electrode.

The negative electrode can be manufactured by suspending, for example, the negative electrode active material, conductive agent, and binder in a general solvent to prepare a slurry, by applying this slurry to the surface of the current collector, and by drying the slurry to form a negative electrode active material-containing layer, followed by pressing. The negative electrode may also be manufactured by forming a pellet-like material from the negative electrode active material, binder, conductive agent to produce a negative electrode active material-containing layer, which is then disposed on the current collector.

2) Positive Electrode

The positive electrode includes a current collector and a positive electrode active material-containing layer (positive electrode material layer). The positive electrode active material-containing layer is formed on one or both surfaces of the current collector and contains an active material, and optionally, a conductive agent and a binder.

As the active material, for example, oxides or sulfides may be used. Examples of the oxides and sulfides include manganese dioxide ($MnO_2$) which is capable of absorbing and releasing lithium ions, iron oxide which is capable of absorbing and releasing lithium ions, copper oxide which is capable of absorbing and releasing lithium ions, nickel oxide which is capable of absorbing and releasing lithium ions, lithium-manganese complex oxides (for example, $Li_xMn_2O_4$ or $Li_xMnO_2$, $0<x \leq 1$), lithium-nickel complex oxides (for example, $Li_xNiO_2$, $0<x \leq 1$), lithium-cobalt complex oxides (for example, $Li_xCoO_2$, $0<x \leq 1$), lithium-nickel-cobalt complex oxides (for example, $Li_xNi_{1-y}Co_yO_2$, $0<x \leq 1$ and $0<y<1$), lithium-manganese-cobalt complex oxides (for example, $Li_xMn_yCo_{1-y}O_2$, $0<x \leq 1$ and $0<y<1$), lithium-manganese-nickel complex oxides having a spinel structure (for example, $Li_xMn_{2-y}Ni_yO_4$, $0<x \leq 1$ and $0<y \leq 1$), lithium phosphate having an olivine structure (for example, $Li_xFePO_4$, $Li_xFe_{1-y}Mn_yPO_4$, and $Li_xCoPO_4$, $0<x \leq 1$ and $0<y<1$), iron sulfate [$Fe_2(SO_4)_3$], vanadium oxides (for example, $V_2O_5$), and lithium-nickel-cobalt-manganese complex oxides. These compounds may be used as the active materials either singly or in combinations of two or more.

Preferable examples of the active material include compounds having a high positive electrode potential such as lithium-manganese complex oxides (for example, $Li_xMn_2O_4$, $0<x \leq 1$), lithium-nickel complex oxides (for example, $Li_xNiO_2$, $0<x \leq 1$), lithium-cobalt complex oxides (for example, $Li_xCoO_2$, $0<x \leq 1$), lithium-nickel-cobalt complex oxides (for example, $Li_xNi_{1-y}Co_yO_2$, $0<x \leq 1$ and $0<y<1$), lithium-manganese-nickel complex oxides having a spinel structure (for example, $Li_xMn_{2-y}Ni_yO_4$, $0<x\le1$ and $0<y\le1$), lithium-manganese-cobalt complex oxides (for example, $Li_xMn_yCo_{1-y}O_2$, $0<x\le1$ and $0<y<1$), lithium iron phosphate (for example, $Li_xFePO_4$, $0<x\le1$), and lithium-nickel-cobalt-manganese complex oxides.

The primary particle diameter of the positive electrode active material is preferably 100 nm to 1 μm. The positive electrode active material having a primary particle diameter of 100 nm or more is easily handled in industrial production. The positive electrode active material having a primary particle diameter of 1 μm or less makes it possible to smoothly progress the in-solid diffusion of lithium ions.

The specific surface area of the active material is preferably 0.1 $m^2/g$ to 10 $m^2/g$. The positive electrode active material having a specific surface area of 0.1 $m^2/g$ or more can secure ample lithium absorption/release sites. When the positive electrode active material having a specific surface area of 10 $m^2/g$ or less is easily handled in industrial production and can secure good charge/discharge cycle performance.

The binder is formulated to bind the active material with the current collector. Examples of the binder include a polytetrafluoroethylene (PTFE), polyvinylidene fluoride (PVdF) and fluoro-rubber. The conductive agent improves the current collecting performance of the active material and reduces the contact resistance between the active material and the current collector. Examples of the conductive agent include carbonaceous materials such as acetylene black, carbon black, or graphite.

The active material and binder in the positive electrode active material-containing layer are preferably formulated in ratios of 80% by mass to 98% by mass and 2% by mass to 20% by mass respectively. When the amount of the binder is designed to be 2% by mass or more, sufficient electrode strength is obtained. When the amount of the binder is designed to be 20% by mass or less, the amount of insulating material to be formulated in the electrode is reduced, enabling reduction in internal resistance. When the conductive agent is added, the active material, binder, and conductive agent are preferably formulated in a ratio of 77% by mass to 95% by mass, 2% by mass to 20% by mass, and 3% by mass to 15% by mass respectively. When the amount of the conductive agent is 3% by mass or more, the aforementioned effect is produced. Also, when the amount of the conductive agent is 15% by mass or less, the decomposition of the nonaqueous electrolyte on the surface of the positive electrode conductive agent when the battery is stored under a high-temperature atmosphere can be reduced.

The current collector is preferably made of an aluminum foil or aluminum alloy foil containing at least one element selected from the group consisting of Mg, Ti, Zn, Ni, Cr, Mn, Fe, Cu, and Si.

The thickness of the aluminum foil or aluminum alloy foil is preferably 5 μm to 20 μm and more preferably 15 μm or less. The purity of the aluminum foil is preferably 99% by mass or more. The content of transition metals such as iron, copper, nickel, or chromium contained in the aluminum foil or aluminum alloy foil is preferably designed to be 1% by mass or less.

The positive electrode can be manufactured by suspending, for example, the active material and binder, and according to the need, the conductive agent in a proper solvent to prepare a slurry, by applying this slurry to the surface of the positive electrode current collector and by drying the slurry to form a positive electrode active material-containing layer, followed by pressing. The positive electrode may also be manufactured by forming a pellet-like material from the active material and binder, and according to the need, the conductive agent to produce a positive electrode active material-containing layer, which is disposed on the current collector.

3) Nonaqueous Electrolyte

The nonaqueous electrolyte may be, for example, a liquid nonaqueous electrolyte prepared by dissolving an electrolyte in an organic solvent or a gel-like nonaqueous electrolyte prepared by making a complex of a liquid nonaqueous electrolyte and a polymer material. The liquid nonaqueous electrolyte is preferably prepared by dissolving the electrolyte in a concentration of 0.5 M/L to 2.5 M/L in the organic solvent.

Examples of the electrolyte include lithium salts such as lithium perchlorate ($LiClO_4$), lithium hexafluorophosphate ($LiPF_6$), lithium tetrafluorophosphate ($LiBF_4$), hexafluoro arsenic lithium ($LiAsF_6$), lithium trifluoromethasulfonate ($LiCF_3SO_3$), and bistrifluoromethylsulfonylimide lithium [$LiN(CF_3SO_2)_2$], or mixtures of these compounds. The electrolyte is preferably one which is scarcely oxidized at a high potential and $LiPF_6$ is more preferable.

Examples of the organic solvent include cyclic carbonates such as propylene carbonate (PC), ethylene carbonate (EC) or vinylene carbonate; chain carbonates such as diethyl carbonate (DEC), dimethyl carbonate (DMC) or methylethyl carbonate (MEC); cyclic ethers such as tetrahydrofuran (THF), 2-methyltetrahydrofuran (2MeTHF), or dioxolan (DOX); chain ethers such as dimethoxyethane (DME) or diethoxyethane (DEE); γ-butyrolactone (GBL), acetonitrile (AN) and sulfolan (SL). These organic solvents may be used either singly or in combinations of two or more.

Examples of the polymer material include a polyvinylidene fluoride (PVdF), polyacrylonitrile (PAN), and polyethylene oxide (PEO).

Also, as the nonaqueous electrolyte, room temperature molten salts (ionic liquid) containing lithium ions, polymer solid electrolytes, inorganic solid electrolytes, or the like may be used.

The room temperature molten salts mean compounds which can exist in a liquid form at room temperature (15 to 25° C.) among organic salts constituted of combinations of organic cations and anions. The room temperature molten salts include those which exist singly in a liquid form, those which take a liquid form when mixed with an electrolyte, and those which take a liquid form when dissolved in an organic solvent. Generally, the melting point of the room temperature molten salt used in a nonaqueous electrolyte battery is 25° C. or less. Also, the organic cation usually has a quaternary ammonium skeleton.

The polymer solid electrolyte is prepared by dissolving an electrolyte in a polymer material, followed by solidifying.

The inorganic solid electrolyte is a solid material having lithium ion conductivity.

4) Separator

The separator may be formed of, for example, porous films containing, for example, polyethylene, polypropylene, cellulose or polyvinylidene fluoride (PVdF) or nonwoven fabrics made of synthetic resins. Among these films, porous films formed of polyethylene or polypropylene can melt at a fixed temperature to cut off current and can therefore improve safety.

5) Case

A container made of a laminate film 0.5 mm or less in thickness or a metal container 1 mm or less in thickness may be used as the case. The laminate film container preferably has a thickness of 0.2 mm or less. The metal container preferably has a thickness of 0.5 mm or less and more preferably 0.2 mm or less.

Examples of the shape of the case include a flat type (thin type), rectangular type, cylinder type, coin type, and button type. The case may be cases for miniature batteries to be mounted in, for example, mobile electronic devices, or cases for large batteries to be mounted on two-wheel or four-wheel vehicles, corresponding to the dimension of the battery.

As the laminate film, a multilayer film prepared by interposing a metal layer between resin layers may be used. The metal layer is preferably formed of an aluminum foil or aluminum alloy foil to reduce the weight of the battery. As the resin layer, polymer materials such as a polypropylene (PP), polyethylene (PE), nylon, and polyethylene terephthalate (PET) may be used. The laminate film can be molded into a case form by sealing it by thermal fusion.

The metal container can be made of aluminum, an aluminum alloy or the like. The aluminum alloy is preferably an alloy containing elements such as magnesium, zinc, or silicon. When the alloy contains transition metals such as iron, copper, nickel, or chromium, the amount of the transition metals is preferably designed to be 100 ppm or less.

Figure 3:
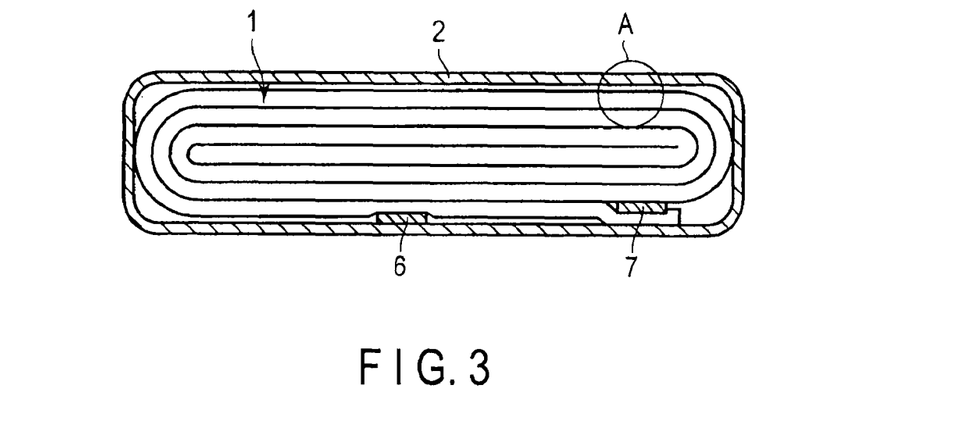
FIG. 3 is a sectional view of a flat type nonaqueous electrolyte battery according to a second embodiment.
Figure 4:
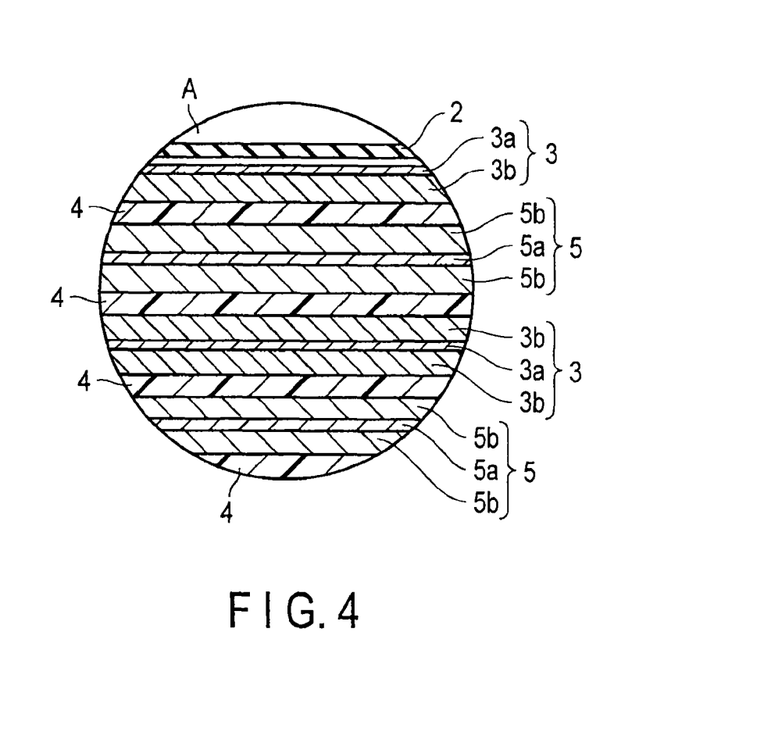
FIG. 4 is an enlarged sectional view of the A part of FIG. 3.

The nonaqueous electrolyte battery according to the second embodiment will be explained in more detail with reference to the drawings. FIG. 3 is a sectional view of a flat type nonaqueous electrolyte secondary battery. FIG. 4 is an enlarged sectional view of the A part of FIG. 3. In this case, each of these drawings is a typical view for explanations and promotion of the understanding of the embodiment. Though there are parts different from an actual battery in shape, dimension and ratio, these structural designs may be properly changed taking the following explanations and known technologies into consideration.

A flat type coil electrode group 1 is accommodated in a baggy case 2 made of a laminate film obtained by interposing a metal layer between two resin layers. The coil electrode group 1 having a flat form is formed by spirally coiling a laminate obtained by laminating a negative electrode 3, a separator 4, a positive electrode 5 and a separator 4 in this order from the outside and by press-molding the coiled laminate.

The negative electrode 3 includes a negative electrode current collector 3a and a negative electrode active material-containing layer 3b. The above negative electrode active material is contained in the negative electrode active material-containing layer 3b. The outermost negative electrode 3 has a structure in which as shown in FIG. 4, a negative electrode active material-containing layer 3b is formed on only one of the inside surfaces of the negative electrode current collector 3a. Other negative electrodes 3 each have a structure in which a negative electrode active material-containing layer 3b is formed on each surface of the negative electrode current collector 3a. In the positive electrode 5, a positive electrode active material-containing layer 5b is formed on each surface of the positive electrode current collector 5a.

As shown in FIG. 3, a negative electrode terminal 6 is connected to the negative electrode current collector 3a of the outermost negative electrode 3 and a positive electrode terminal 7 is connected to the positive electrode current collector 5a of the inside positive electrode 5 in the vicinity of the outer peripheral end of the coil electrode group 1. These negative electrode terminal 6 and positive electrode terminal 7 are externally extended from an opening part of the baggy case 2. A liquid nonaqueous electrolyte is, for example, injected from the opening part of the baggy case 2.

The opening part of the baggy case 2 is closed by heat sealing with the negative electrode terminal 6 and positive electrode terminal 7 extended out of the opening part to thereby seal the coil electrode group 1 and liquid nonaqueous electrolyte.

The negative electrode terminal 6 can be made of a material having electric stability at the Li absorption/release potential of the negative electrode active material and conductivity. Examples of the material for the negative electrode terminal include copper, nickel, stainless, and aluminum. The negative electrode terminal 6 is preferably made of the same material as the negative electrode current collector 3a to reduce the contact resistance with the negative electrode current collector 3a.

The positive electrode terminal 7 can be made of, for example, a material having electric stability in a potential range from 3 V (vs. Li/Li$^+$) to 5 V (vs. Li/Li$^+$) and conductivity. Specifically, the positive electrode terminal 7 can be made of aluminum or aluminum alloys containing one or more elements selected from the group consisting of Mg, Ti, Zn, Mn, Fe, Cu, and Si. The positive electrode terminal 7 is preferably made of the same material as the positive electrode current collector 5a to reduce the contact resistance with the positive electrode current collector 5a.

Figure 5:
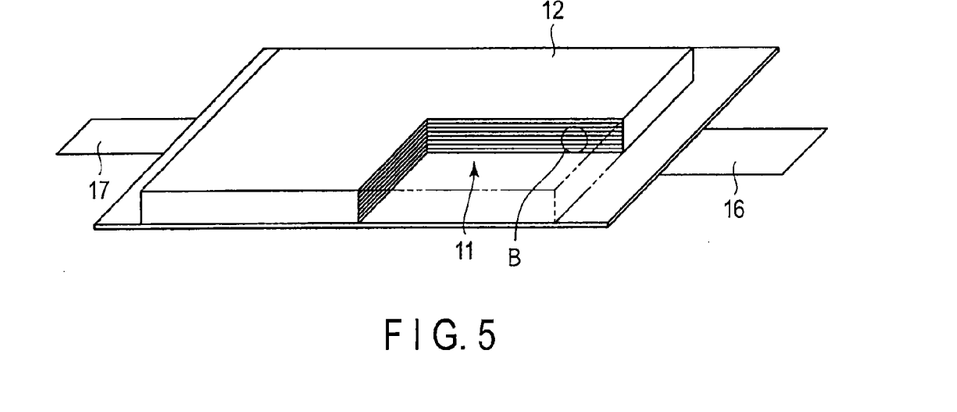
FIG. 5 is a partially broken perspective view typically showing other flat type nonaqueous electrolyte battery according to a second embodiment.
Figure 6:
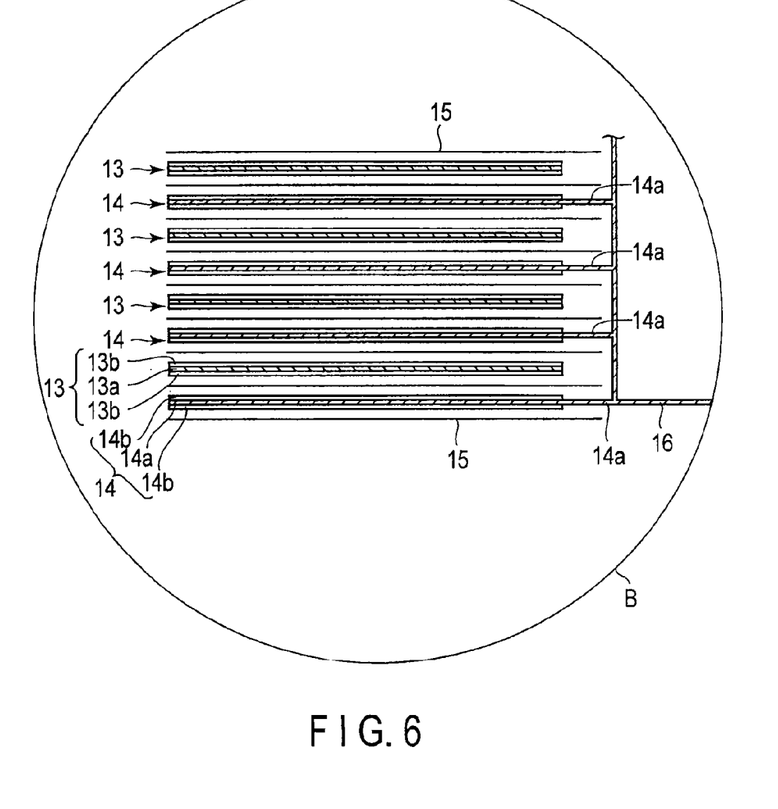
FIG. 6 is an enlarged sectional view of the B part of FIG. 5.

The nonaqueous electrolyte battery according to the second embodiment is not limited to the structure shown in the aforementioned FIGS. 3 and 4 and may be a battery having the structure shown in, for example, FIGS. 5 and 6. FIG. 5 is a partially broken perspective view typically showing another flat type nonaqueous electrolyte secondary battery according to the second embodiment and FIG. 6 is an enlarged sectional view of the B-part of FIG. 5.

A laminate electrode group 11 is accommodated in a case 12 made of a laminate film produced by interposing a metal layer between two resin films. The laminate electrode group 11 has, as shown in FIG. 6, a structure in which a positive electrode 13 and a negative electrode 14 are alternately laminated with a separator 15 being interposed therebetween. The positive electrode 13 exists in the plural and each provided with a current collector 13a and a positive electrode active material-containing layer 13b carried on each surface of the current collector 13a. The negative electrode 14 exists in the plural and each provided with a negative electrode current collector 14a and a negative electrode active material-containing layer 14b carried on each surface of the negative electrode current collector 14a. One side of the negative electrode current collector 14a of each negative electrode 14 is projected from the negative electrode 14. The projected negative electrode current collector 14a is electrically connected to a band-like negative electrode terminal 16. The end of the band-like negative electrode terminal 16 is projected externally from the case 11. The side of the positive electrode current collector 13a of the positive electrode 13, that is, the side positioned opposite to the side from which the negative electrode current collector 14a is projected is, though not shown, projected from the positive electrode 13. The positive electrode current collector 13a projected from the positive electrode 13 is electrically connected to a band-like positive electrode terminal 17. The end of the band-like positive electrode terminal 17 is positioned on the side opposite to the negative electrode terminal 16 and externally extended from the side of the case 11.

The above nonaqueous electrolyte battery according to the second embodiment includes the negative electrode containing the active material according to the first embodiment and therefore, a nonaqueous electrolyte battery which is superior in productivity and has excellent quick charge/discharge performance and high energy density can be provided.

Third Embodiment

Next, a battery pack according to a third embodiment will be explained with reference to the drawings. The battery pack according to the third embodiment includes as a unit cell one or two or more of the above nonaqueous electrolyte batteries according to the above second embodiment and a casing in which the nonaqueous electrolyte battery is accommodated. When the battery pack includes two or more unit cells, these unit cells are disposed in such a manner that they are electrically connected in series or in parallel.

Figure 7:
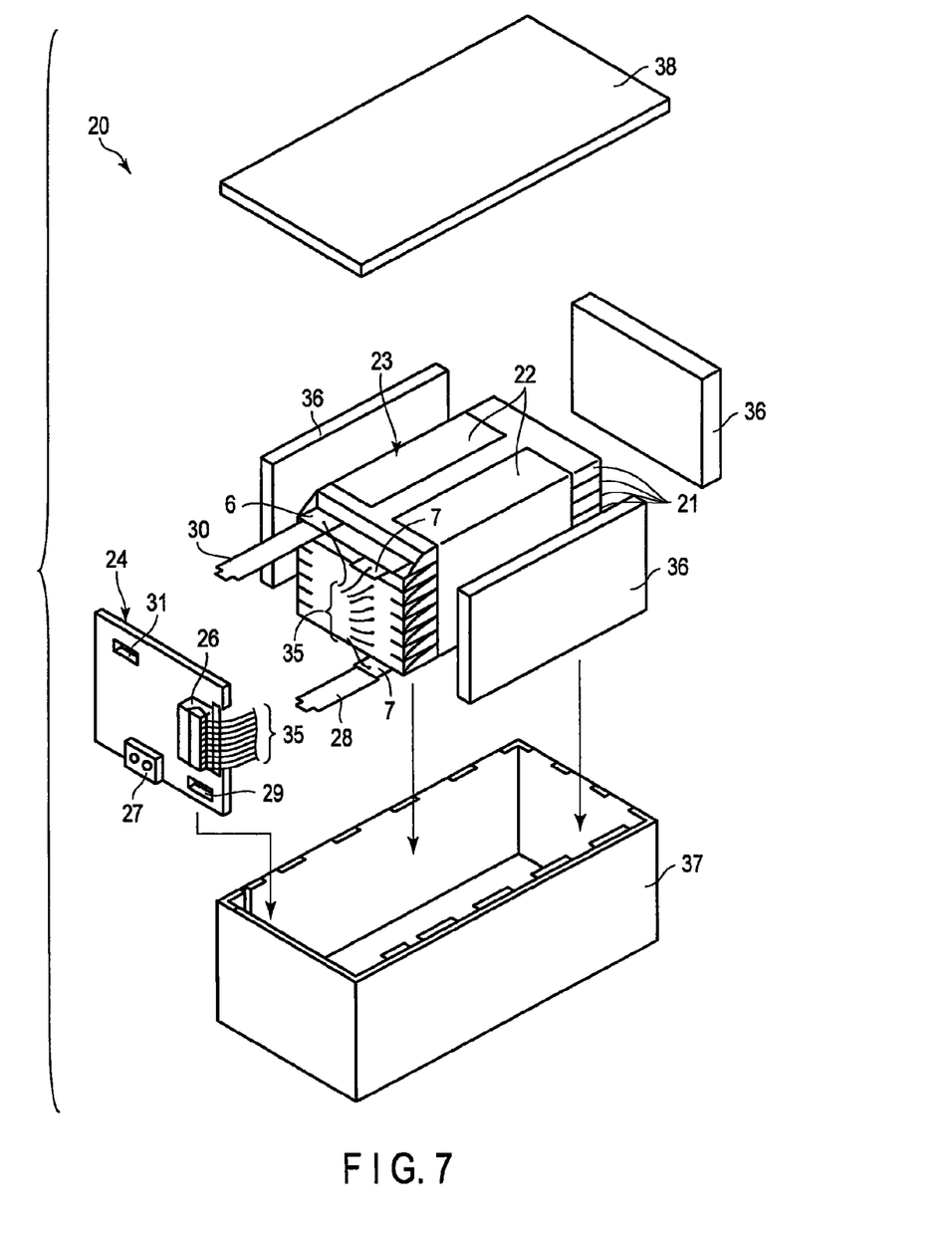
FIG. 7 is an exploded perspective view of a battery pack according to a third embodiment.
Figure 8:
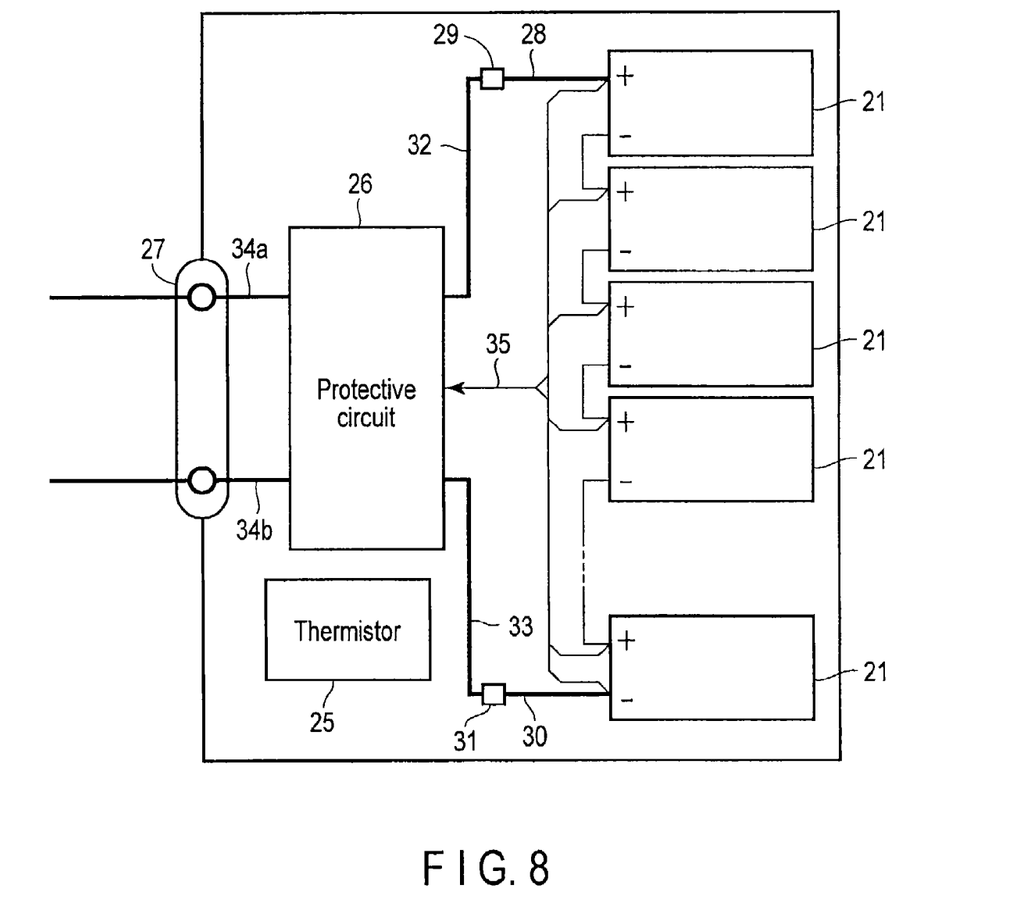
FIG. 8 is a block diagram showing an electric circuit of the battery pack of FIG. 7.

FIGS. 7 and 8 show an example of a battery pack 20. The battery pack 20 includes a plurality of flat type batteries 21 each having the structure shown in FIG. 3. FIG. 7 is an exploded perspective view of the battery pack 20. FIG. 8 is a block diagram showing an electric circuit of the battery pack 20 shown in FIG. 7.

The plurality of unit cells 21 are laminated such that the externally extended negative electrode terminals 6 and positive electrode terminals 7 are arranged in the same direction and fastened with an adhesive tape 22 to thereby configure a battery module 23. These unit cells 21 are electrically connected in series as shown in FIG. 8.

A print wiring board 24 is disposed opposite to the side surface of the unit cell 21 from which the negative electrode terminal 6 and positive electrode terminal 7 are extended. As shown in FIG. 8, a thermistor 25, a protective circuit 26 and an energizing terminal 27 connected to external devices are mounted on the print wiring board 24. An insulating plate (not shown) is attached to the surface of the print wiring board 24 facing the battery module 23 to avoid unnecessary electrical connection with the wiring of the battery module 23.

A positive electrode lead 28 is connected with the positive electrode terminal 7 positioned on the lowermost layer of the battery module 23 with its end being inserted into a positive electrode connector 29 of the print wiring board 24 for electrical connection. A negative electrode lead 30 is connected with the negative electrode terminal 6 positioned on the uppermost layer of the battery module 23 with its end being inserted into a negative electrode connector 31 of the print wiring board 24 for electrical connection. These connectors 29 and 31 are connected to a protective circuit 26 through wirings 32 and 33 formed on the print wiring board 24.

The thermistor 25 is used to detect the temperature of the unit cell 21 and the detected signals are transmitted to the protective circuit 26. The protective circuit 26 can shut off a plus wiring 34a and minus wiring 34b between the protective circuit 26 and the energizing terminal 27 connected to external devices in a predetermined condition. The predetermined condition means, for example, the case where the temperature detected by the thermistor 25 is above a predetermined one. Also, the predetermined condition means, for example, the case of detecting overcharge, overdischarge and over-current of the unit cell 21. The detections of this overcharge and the like are made for individual unit cells 21 or battery module 23. When individual unit cells 21 are detected, either the voltage of the battery may be detected or the potential of the positive electrode or negative electrode may be detected. In the latter case, a lithium electrode used as a reference electrode is inserted between individual unit cells 21. In the case of FIGS. 7 and 8, a wiring 35 for detecting voltage is connected to each unit cell 21 and the detected signals are transmitted to the protective circuit 26 through these wirings 35.

A protective sheet 36 made of a rubber or resin is disposed on each of the three side surfaces of the battery module 23 excluding the side surface from which the positive electrode terminal 7 and negative electrode terminal 6 are projected.

The battery module 23 is accommodated in a container 37 together with each protective sheet 36 and print wiring board 24. Specifically, the protective sheet 36 is disposed on each inside surface in the direction of the long side and on one of the inside surfaces in the direction of the short side of the container 37, and the print wiring board 24 is disposed on the opposite inside surface in the direction of the short side. The battery module 23 is positioned in a space enclosed by the protective sheet 36 and the print wiring board 24. A lid 38 is attached to the upper surface of the container 37.

Here, a thermally contracting tape may be used in place of the adhesive tape 22 to secure the battery module 23. In this case, after the protective sheet is disposed on both sides of the battery module and the thermally contracting tapes are wound around the battery module, the thermally contracting tape is contracted by heating to fasten the battery module.

The structure in which the unit cells 21 are connected in series is shown in FIG. 7 and FIG. 8. However, these unit cells 21 may be connected in series to increase the capacity of the battery. Or, series cell connection and parallel cell connections may be combined. Also, the battery packs may be further connected in series or parallel.

Also, the structure of the battery pack is appropriately changed according to its use. The battery pack is preferably used in applications required to exhibit excellent cycle performance at a large current. Specifically, the battery pack is used as power sources for digital cameras, and batteries mounted on vehicles such as two- to four-wheel hybrid electric cars, two- to four-wheel electric cars, and assist bicycles. The battery pack is preferably used for batteries mounted on vehicles.

According to the third embodiment, the nonaqueous electrolyte battery of the second embodiment is included and therefore, a battery pack which is superior in productivity, and also has excellent quick charge/discharge performance and a high energy density can be provided.

EXAMPLES

The above embodiments will be explained in more detail by way of examples.

Example 1

Production of a Titanium Complex Oxide

A mixture of niobium oxide ($Nb_2O_5$) and anatase type titanium oxide ($TiO_2$) were made into a pellet form of 20 mmϕ, 2 mm in height and calcined at 1350° C. for 18 hours in an atmosphere in an electric furnace. Then, the calcined pellet was quenched in water kept at about 25° C. to synthesize $TiNb_2O_7$. Obtained $TiNb_2O_7$ was ground under dry condition by using zirconia beads to adjust grain size, thereby obtaining a battery active material.

The obtained battery active material was measured by X-ray diffraction in the following condition. As a result, it was confirmed that the major component constituting the battery active material was a monoclinic oxide represented by the formula $TiNb_2O_7$.

<Measuring Method>

A sample was filled in a standard glass holder 25 mm in diameter to measure by a wide-angle X-ray diffraction method. A measuring device and condition are shown in the following.
(1) X-ray diffractometer: D8 ADVANCE (shielded tube type) manufactured by Bruker AXS Company.
  X-ray source: CuKα rays (using a Ni filter)
  Output: 40 kV, 40 mA
  Slit system: Div. Slit; 0.3°
  Detector: LynxEye (high-speed detector)
(2) Scan system: 2θ/θ continuous scan
(3) Measuring range (2θ): 5 to 100°
(4) Step width (2θ): 0.01712°
(5) Counting time: 1 sec/step Also, the lattice constants a, b, c, and β and unit cell volume V of a monoclinic oxide represented by the formula $TiNb_2O_7$ were calculated from the results of measurement of WAXD, to find that a was 20.378 (Å), b was 3.792 (Å), c was 11.919 (Å), β was 120.28 (°), and V was 795.3 (Å$^3$).

The concentration of oxygen was measured by an inert gas fusion infrared absorption method (trade name: TC-600 model, manufactured by LECO Corporation), to find that it was 32.2% by mass. The concentration of oxygen of the monoclinic oxide represented by $TiNb_2O_7$ based on the stoichiometric composition is 32.4% by mass. It is found from a comparison between the concentration of oxygen measured by the inert gas fusion infrared absorption method and the concentration of oxygen based on the stoichiometric composition that oxygen defects are contained in the monoclinic oxide of Example 1.

<Production of an Electrode>

90% by weight of the obtained battery active material powder, 5% by weight of acetylene black used as a conductive agent, and 5% by weight of polyvinylidene fluoride (PVdF) were added in N-methylpyrrolidone (NMP) and mixed to prepare a slurry. This slurry was applied to each surface of a current collector made of an aluminum foil 15 μm in thickness and dried. Then, the dried coating layer was pressed to manufacture a negative electrode having an electrode density of 2.4 g/cm$^3$.

<Preparation of a Liquid Nonaqueous Electrolyte>

Ethylene carbonate (EC) and ethylmethyl carbonate (EMC) were mixed in a ratio by volume of 1:2 to prepare a mixture solvent. 1 M of $LiPF_6$ which was an electrolyte was dissolved in this mixture solvent to prepare a liquid nonaqueous electrolyte.

<Production of a Beaker Cell>

A beaker cell was manufactured using the produced electrode as the working electrode and a lithium metal as the counter electrode and reference electrode and the aforementioned liquid nonaqueous electrolyte was injected into the beaker cell to complete the beaker cell.

Example 2

A battery active material was obtained in the same manner as in Example 1 except that the quenching was performed in ice water after the pellet was calcined at 1350° C. for 18 hours instead of quenching in water in the production of the battery active material. A beaker cell was completed in the same manner as in Example 1 by using the obtained battery active material.

Example 3

A battery active material was obtained in the same manner as in Example 2 except that the height of the pellet was altered to 5 mm in the production of the battery active material. A beaker cell was completed in the same manner as in Example 1 by using the obtained battery active material.

Example 4

A battery active material was obtained in the same manner as in Example 2 except that the height of the pellet was altered to 10 mm in the production of the battery active material. A beaker cell was completed in the same manner as in Example 1 by using the obtained battery active material.

Comparative Example 1

A beaker cell was completed in the same manner as in Example 1 except that after the pellet was calcined at 1350° C. for 18 hours, the power source of the electric furnace was turned off and the calcined pellet was allowed to stand as it was in the furnace to slowly cool the calcined pellet instead of quenching in water, to obtain a battery active material.

Each of the beaker cells of Examples 1 to 4 and Comparative Example 1 was charged and discharged in a 25° C. environment in a voltage range of 1 to 3 V (vs Li/Li$^+$) to find 0.2 C capacity and 10 C capacity per unit mass of the active material. The ratio X (%) of the 10 C capacity to 0.2 C capacity was calculated from the following equation (I). The results are shown in Table 1.

$$X=(C_{10}/C_{0.2})\times100 \qquad (I)$$

wherein $C_{0.2}$ is a 0.2 C capacity and $C_{10}$ is a 10 C capacity.

The lattice constant a, unit cell volume V, oxygen content, and presence or absence of oxygen defects in Examples and Comparative Example are described together in Table 1.

TABLE 1

| | Lattice constant a (Å) | Unit cell volume V (Å$^3$) | Oxygen content (mass %) | Oxygen defects | X(%) |
|---|---|---|---|---|---|
| Comparative Example 1 | 20.353 | 793.4 | 32.4 | No oxygen defect | 65 |
| Example 1 | 20.378 | 795.3 | 32.3 | Oxygen defects | 75 |
| Example 2 | 20.448 | 800.0 | 31.8 | Oxygen defects | 84 |
| Example 3 | 20.428 | 798.3 | 32.0 | Oxygen defects | 82 |
| Example 4 | 20.398 | 796.0 | 32.2 | Oxygen defects | 78 |

As is clarified from Table 1, it is understood that Examples 1 to 4 each using an active material made of $LiTiNb_2O_7$ having a unit cell volume of 795 Å$^3$ or more each had a larger ratio X (10 C capacity/0.2 C capacity) (%) and was therefore more excellent quick charge/discharge performance than Comparative Example 1 using an active material having a unit cell volume less than 795 Å$^3$. Also, the active materials used in Examples 1 to 4 each had oxygen defects, whereas the active material used in Comparative Example 1 had no oxygen defect. According to the active material in these embodiments and Examples, the monoclinic oxide represented by $Li_xTiNb_2O_7$ (0≤x≤5) and having a unit cell volume of 795 Å$^3$ or more is contained, and therefore, a battery active material having superior quick charge/discharge performance and a high energy density can be provided.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising a monoclinic oxide of the formula $Li_xTiNb_2O_7$ (0≤x≤5) having a unit cell volume of from 795 Å³ to 800 Å³.

2. The active material according to claim 1, wherein the monoclinic oxide has a lattice constant a satisfying the following equation: 20.37 Å≤a≤20.53 Å.

3. The active material according to claim 1, wherein the monoclinic oxide comprises oxygen defects.

4. The active material according to claim 1, wherein a BET specific surface area of the monoclinic oxide is from 0.1 m²/g (inclusive) to 100 m²/g (exclusive).

5. The active material according to claim 1, wherein a crystal structure of the monoclinic oxide has space group C2/m symmetry.

6. A nonaqueous electrolyte battery comprising: a positive electrode; a negative electrode containing the active material as claimed in claim 1; and a nonaqueous electrolyte.

7. The battery according to claim 6, wherein the positive electrode comprises at least one active material selected from the group consisting of a manganese dioxide, an iron oxide, a copper oxide, a nickel oxide, a lithium-manganese complex oxide, a lithium-nickel complex oxide, a lithium-cobalt complex oxide, a lithium-nickel-cobalt complex oxide, a lithium-manganese-cobalt complex oxide, a lithium-manganese-nickel complex oxide having a spinel structure, a lithium phosphate having an olivine structure, an iron sulfate, a vanadium oxide, and a lithium-nickel-cobalt-manganese complex oxide.

8. The battery according to claim 6, wherein the negative electrode comprises at least one selected from the group consisting of titanium dioxide having an anatase structure, titanium dioxide having a monoclinic β-type structure, lithium titanate having a ramsdellite structure, and lithium titanate having a spinel structure.

9. The battery according to claim 6, wherein the negative electrode comprises a current collector and a negative electrode active material-containing layer,
the active material-containing layer comprises a negative electrode active material, a conductive agent and a binder,
an amount of the negative electrode active material in the active material containing layer is 68% by mass to 96% by mass,
an amount of the conductive agent in the active material-containing layer is 2% by mass to 30% by mass, and
an amount of the binder in the active material-containing layer is 2% by mass to 30% by mass.

10. A battery pack comprising the nonaqueous electrolyte battery as claimed in claim 6.

11. A battery pack according to claim 10, further comprising a protective circuit which can detect the voltage of the nonaqueous electrolyte battery.

12. An active material comprising a monoclinic oxide of the formula $$Li_xTiNb_2O_7$$

wherein
x is from 0 to 5,
a unit cell volume of the active material is from 795 Å³ to 800 Å³,
a lattice constant of the monoclinic oxide satisfies the equation:

$$20.37\ \text{Å} \leq a \leq 20.53\ \text{Å}$$

and the monoclinic oxide comprises oxygen defects.

* * * * *